United States Patent [19]
Schmatz

[11] 3,855,679
[45] Dec. 24, 1974

[54] ALUMINUM SOLDERING

[75] Inventor: Duane J. Schmatz, Dearborn Heights, Mich.

[73] Assignee: Ford Motor Company, Detroit, Mich.

[22] Filed: Nov. 5, 1973

[21] Appl. No.: 413,157

[52] U.S. Cl. .................. 29/197, 29/492, 29/495, 29/497
[51] Int. Cl. .............................. B23p 3/00
[58] Field of Search ............ 29/492, 495, 497, 504, 29/197; 75/166 C, 166 D

[56] References Cited
UNITED STATES PATENTS

| | | | |
|---|---|---|---|
| 2,513,365 | 7/1950 | Rogoff | 29/492 X |
| 2,781,577 | 2/1957 | Smellie | 29/492 |
| 2,824,365 | 2/1958 | Erickson | 29/492 |
| 3,074,158 | 1/1963 | Finnegon | 29/495 |
| 3,103,067 | 9/1963 | Dixon | 29/492 X |
| 3,105,293 | 10/1963 | Skinner et al. | 29/492 X |
| 3,330,028 | 7/1967 | Elbreder | 29/495 |
| 3,393,446 | 7/1968 | Hughes et al. | 29/197 X |
| 3,497,400 | 2/1970 | Stokes, Jr. et al. | 29/495 X |
| 3,718,961 | 3/1973 | Harper | 29/197 X |
| 3,768,141 | 10/1973 | Schmatz et al. | 29/495 |

FOREIGN PATENTS OR APPLICATIONS
814,262   6/1959   Great Britain ..................... 29/492

*Primary Examiner*—Francis S. Husar
*Assistant Examiner*—Ronald J. Shore
*Attorney, Agent, or Firm*—Joseph W. Malleck; Keith L. Zerschling

[57] ABSTRACT

A method is disclosed of effecting a corrosion resistant joint between the surface of an untreated aluminum part and the surface of a heat sensitive dissimilar metal part having a maximum tolerance temperature level. After anhydrous fluxing, a first soldering composition is adhered to a depression in the aluminum part or other equivalent means to maintain residency of the first solder until the flux reacts. The first soldering compression should be deposited with a thickness across the joint of at least 0.003 inch. The first composition consists essentially of lead, 1–10 percent tin, a significant amount of silver up to 5 percent and not over 0.1 percent antimony. After a second organic or acid fluxing, a second soldering composition is then employed having a melting temperature below said tolerance level; while in the heated condition the heat sensitive part is joined to the soldered assembly.

11 Claims, 4 Drawing Figures

ALUMINUM SOLDERING

BACKGROUND OF THE INVENTION

Efforts have heretofore been made to bond an aluminum part to a part made of a dissimilar metal, such as copper or brass, each of which is miscible in aluminum at bonding temperatures. The results of such efforts have not been satisfactory precisely because of the dissolution of copper in the aluminum causing serious deformation of the aluminum part. One proposal by the prior art to overcome this problem of miscibility has been to place an insert between the two parts, which insert is made of a metal, such as nickel, that can be readily joined to each of the two parts without fear of miscibility. However, other difficulties arise in bonding the aluminum part to the insert. For example, if it is proposed to braze the aluminum part to the insert with an aluminum-silicon brazing alloy, a brazing temperature of around 640° C will be required. This temperature is so close to 660° C, the melting point of aluminum, that there is the possibility of inadvertently melting the aluminum during brazing and thereby deforming the aluminum part.

Soldering alloys having lower brazing temperatures have also been considered because of corrosion resistance which is an important characteristic of any soldered joint. The corrosion resistance of joints soldered with zinc rich solders, which are generally considered to be the best available soldered aluminum joints by the prior art, are generally adequate because the zinc solder is sacrificial to the aluminum. However, if the aluminum is to be joined to a dissimilar metal, such as copper brass, the zinc solders are not adequate to form a corrosion resistant joint. Embrittlement of the copper and brass occurs through the formation of high zinc inter-metallic phases and there is a susceptability to interfacial corrosion at the copper-solder interface.

If the aluminum surface to be bonded is part of an electronic assembly, where heat sensitive components are employed, an additional problem is presented apart from miscibility and corrosion resistance. The soldering material must then be of a type which does not require high soldering temperatures, at least not a temperature which is equal to or in excess of the sensitivity limit of the component to be soldered. For example, if a diode is desired to be joined to an aluminum alternator housing to serve as a heat transfer joint, the maximum sensitivity temperature assembly may be about 400° F. Successful soldering of a corrosion resistant joint between aluminum and a dissimilar miscible metal will require a soldering temperature in excess of 400° F, the component will be damaged accordingly during fabrication.

SUMMARY OF THE INVENTION

A primary object of this invention is to provide a method of bonding an aluminum part to a dissimilar metallic part, which method protects any component to the joint which is heat sensitive and insures that the resulting of bond will be highly corrosion resistant and relatively free from internal stress.

Another object of this invention is to provide a method of joining an aluminum surface with a dissimilar metallic surface such as copper brass, the method being of a duplex character wherein a relatively high melting solder material is first applied to the aluminum surface after prefluxing, the first solder material being effective to provide a corrosion resistant barrier in the joint, a low-melting solder material is then applied after a second pre-fluxing.

A particular feature pursuant to the above objects is the employment of a first solder material characterized by consisting essentially of lead, with 3–5 percent tin and a significant amount of silver up to 5 percent and having little or no trace of antimony. The second soldering material is characterized by a lead-tin binary system having a melting temperature predetermined to be below the temperature sensitivity level of the component to be joined.

DETAILED SPECIFICATION

Figure 1:
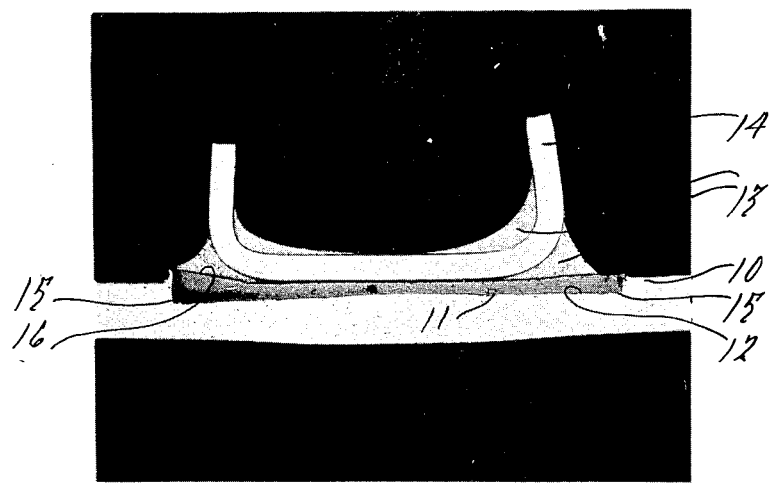
FIG. 1 is a typical elevation view of an aluminum-dissimilar metal soldered joint according to this invention (6.5X)

Attaching aluminum to other components made of either aluminum or dissimilar metals with solder, and obtaining a corrosion resistant bond, is very difficult. The available systems include high zinc solders, which are the most corrosion resistant, but have high melting points, or high tin solders, which have poor corrosion resistance, but have low melting points. A new lead base solder (as disclosed in U.S. application Ser. No. 228,300, now U.S. Pat. No. 3,768,141 assigned to the assignee herein), containing small amounts of tin (typically 3–5 percent), a certain range of silver (typically 1–2 percent) and a specified absence of antimony, has been shown to produce a good corrosion resistant joint between aluminum and copper or brass. While this solder has been used to produce conventional heat exchanger components, such as radiators and heater cores, too high of a soldering temperature will be required for soldering electrical components which may be damaged by heat.

The process of this invention has been developed to use this lead-base solder for joining any component to aluminum. This method avoids overheating of the component or may be preferred for its simple convenience.

By coating the aluminum with a layer of the PbSnAg solder at about 630° F, allowing it to cool, and then soldering the diode or other component on to the solder layer at 375° to 400° F with a low melting solder, such as PbSn, a joint is effected which is strong and corrosion resistant. The other solder systems described cannot be used in this manner. High zinc solders will attack brass and copper forming a brittle layer and furthemore, zinc is very difficult to wet with lead base solders. The high tin solders actually have a low enough soldering temperature to use a single step process but produce interfacial corrosion.

Corrosion Sensitivity

Except for a few systems, the soldering of aluminum involves the lifting of the oxide film by flux reaction followed by deposition of a heavy metal conversion layer onto the aluminum. The solder then wets and chemically interacts with this layer. The layer is developed by the reaction of metal chlorides with aluminum to form a metal and aluminum chloride. With zinc rich solders, a zinc chloride base is usually recommended and with tin rich solders a tin chloride base flux is usually used. When a particular solder is being considered for an application or is being developed, one must either choose or develop a suitable flux since the flux reaction with the aluminum becomes an important part of the solder system. Solders based on elements such as lead, tin, cadmium and bismuth inherently have poor corrosion resistance. These elements are constituents of the low melting solders which have limited solubility in aluminum. The phase diagrams of these elements with aluminum are all of the monotectic type with two terminal solid solutions having very little mutual solid solubility. A corrosion sensitive solder-aluminum interface is created because the terminal solutions are bound to be electrochemically different.

If a single phase solid solution can be formed at the interface, an improvement in the corrosion resistance will be obtained according to one aspect of this invention. Therefore, the method of this invention comprehends a first solder which has an ingredient introduced into a lead-base system which will interact with aluminum in the flux reaction product to form a single phase solid solution. This element can be selected from the group consisting of silver, copper and magnesium, since these have some mutual solubility in aluminum. The silver addition produces a dramatic improvement in corrosion resistance. Silver, when added to a lead base product, produces a solder aluminum interface which is structurally different than that produced with any of the other solders.

Heat Sensitivity

This soldering system of lead-tin-silver requires a soldering temperature in the range of 650°-720° F which makes it impossible to solder temperature sensitive electrical components to aluminum. To retain the effectiveness of the corrosion resistance of the lead-tin-silver system, and yet introduce the capability of soldering joints to heat sensitive components, the following preferred method was discovered (see with reference to FIG. 1):

a. an anhydrous flux is first applied to the aluminum surface 10 to be jointed,
b. the fluxed surface is then subjected to a first solder material 11 consisting essentially of lead, 1-10 percent tin, a significant amount of silver up to 5 percent and not over 0.1 percent antimony, the PbSnAg material is placed in a slight depression 12 on the aluminum part to maintain its residency until the flux reacts,
c. the first solder and surface is heated to a temperature effective to melt the first soldering composition (typically over 400° F); this heating is carried out for a period of time sufficient to establish a silver rich interface between the aluminum surface and the soldering composition,
d. after the first soldering composition is cooled and after washing away chloride residuals in hot water, the first soldered material is then fluxed with a low temperature flux, such as rosin,
e. a second soldering 13, composition is then applied to the refluxed first soldering material, the second soldering composition being principally of the PbSn binary system (although variations with cadmium, bismuth or indium are suitable) and effective to provide a low melting characteristic particularly at temperatures below the sensitivity level of the component 14 to be joined, and
f. the second soldering composition 13 and joint (10 and 11) is then heated to a temperature to melt the second soldering system 13 permitting attachment of said heat sensitive part 14 to the joint providing a durable bond between the parts.

A specific example of a preferred soldering composition for each of said steps in the method is:

| Composition No. 1 | lead 96.7% |
| | tin 2.5% |
| | silver 2.5% |
| | soldering temperature - 615°F |
| Composition No. 2 | tin 60% |
| | lead 40% |
| | antimony |
| | flux-tin chloride |
| | melting temperature - 320°F |

First Soldering Composition

With the first soldering composition, there is some diffusion into the aluminum during soldering. An electron microprobe line profiles and x-ray photographs have corroborated this interface. There appears to be no interaction of lead or tin with the aluminum. The interaction with aluminum is limited to zinc, copper and silver. Because of the rapid diffusion of silver in lead, in both the liquid and solid, the silver-zinc reaction occurs before any other interfacial reactions occur. A small amount of aluminum is therefore found within the silver-zinc layer because of the initial aluminum-zinc reaction. Also, some copper is usually found in the layer. The copper is undoubtedly a result of a brass-solder reaction. Thus the composition and structure of the interface layer is basically a silver rich solid solution containing zinc, aluminum and copper. The ratio of silver to zinc is approximately three to one.

It is important to point out that antimony will react with the aluminum at the aluminum solder interface even though the silver-zinc layer is also forming. For good corrosion resistance, the antimony must be maintained below 1 percent. A noticeable deterioration in corrosion resistance is seen as the antimony is increased. This pronounced effect of antimony is undoubtedly the reason previous investigators found little effect of silver additions to lead-tin solders when used to solder aluminum.

Nonetheless, the first soldering composition of this inventive method may have a fairly wide range of compositional limits that will produce an adequate foundation for the joint. The tin content of the improved solder may be as high as 10 percent. As the tin content is lowered to the vicinity of 1 percent the solder becomes unsatisfactory because the general bulk corrosion resistance of the solder is too low relative to many corrosive agents, particularly in the presence of aluminum. Too high a tin content is economically unattractive and introduces interfacial corrosion. Therefore an optimum range for the tin content has been found to be about 3-5 percent although tin in the range of 1-10 percent is operational. Silver in amounts as low as 0.5 percent have been found to give beneficial results. A continuous improvement in both joint strength and interfacial corrosion resistance is obtained with increasing silver contents up to about 2.5 percent. Between 2.5 and 5 percent silver, the melting point is increased to such an extent that it becomes more difficult to work and the economic disadvantages inherent in the high price of silver begin to outweigh the minor increases in both strength and corrosion resistance that are obtained. The optimum silver range has been found to be from 2-3 percent, although any significant amount up to 5 percent is operational.

The first soldering composition is quite tolerant of both cadmium and bismuth. As much as 2 percent of either of these metals produces no adverse effects upon the utility of the solder. This is particularly advantageous because of the difficulty of removing bismuth from lead and the widespread presence of bismuth in secondary lead. Furthermore, this solder operates satisfactorily with the usual soldering fluxes and especially with the zinc chloride flux normally used for soldering operations. However, the zinc chloride or other flux must be anhydrous; it should be conveniently dissolved in a dry organic solvent rather than water. A concentration of 15 to 50 grams of anhydrous flux in 100 cc of solvent is adequate.

The first action of the anhydrous flux is to lift or disrupt the strongly inherent film of aluminum oxide on the aluminum. The aluminum surface so cleaned reacts with the flux by a simple replacement reaction to form a layer of metallic zinc upon the aluminum substrate. As the zinc continues to form, diffusion into the aluminum occurs. After the first soldering composition wets the zinc surface, silver from the solder diffuses into the interface and rapidly combines with the remaining zinc to form a silver rich zinc alloy. A solder-aluminum interface is formed comprising a layer of about 75 percent silver, 25 percent zinc separating the solder, now somewhat depleted in silver, from aluminum into which zinc diffusion has occurred.

As with aluminum soldering done with chloride fluxes, cleaning is necessary to remove the residual chloride.

A procedure which has proved adequate consists of a hot water wash followed by an immersion in a 2 percent sodium hydroxide NaOH solution, a rinse, and immersion in a 5 percent $H_3PO_4$ solution and then a final rinse.

Process Variables — First Soldering Composition

The process variables that were investigated were the flux composition, concentration, soldering time and temperature, and aluminum composition. The flux that was found to produce good results contained 88 percent $ZnCl_2$, 10 percent $NH_4Cl$ and 2 percent NaF. An organic vehicle is required to prevent interactions with water, which decrease the flux effectiveness by the formation of oxychlorides and prevent soldering. The vehicle that was generally used was a mixture of 90 percent methyl ethyl keytone and 10 percent methanol. Other solvents used, but with little success, were N-butyl and N-propyl alcohol. The solubility of the flux constituents was somewhat lower in these solvents and produced a non-uniform distribution of flux on the part to be soldered. The first mixture dissolved nearly all of the solids and produced a uniform distribution of flux. After fluxing, the vehicle was either ignited or evaporated prior to soldering. The composition of flux must be adjusted so that the solder is molten at the time that the flux reacts. If the solder is not molten or in a condition to wet the surface when the flux reacts, the reaction layer may reoxidize and no wetting will occur. It is necessary, therefore, to have an adequate thickness of solder on the substrate to which the aluminum is to be soldered. Experiments have shown that for a typical application 0.6 mils is required (a minimum soldered thickness). To insure that the first solder will have a residency to be present when the flux reacts, a slight depression (or some other geometric configuration) on the aluminum part is employed to prevent the melted solder from running away or off the joint.

Thickness of the first soldering composition plays an important role in developing corrosion resistance. With a very thin coating of the silver bearing solder (under 0.002 inch) a reaction through the solder appears to occur between tin and aluminum and poorer corrosion results are obtained. With a coating at least 0.003 inch thick, no secondary reaction occurs and the corrosion resistance is excellent. The critical area for corrosion is at the interface 15 between the aluminum part and the first soldering composition (see FIG. 1). Not only may corrosion occur because of inadequate covering due to the thinness of the solder 11, but enough silver may not be available to develop an adequate aluminum-solder 11 interface. A less desirable but operable alternative can be to solder a thin piece of copper or brass to the aluminum during the first soldering step. During the second soldering step, the heat sensitive componentn would be soldered to the copper piece and the possibility of reaction between the two solders would be eliminated.

The flux concentration is also an important consideration. If too little flux is present, the aluminum is not cleaned properly and soldering will be poor. With a moderate amount of flux, the amount of zinc formed can be accommodated by diffusion into the aluminum and by reaction with silver from the solder to form the silver-zinc layer without excess zinc remaining. With a high flux concentration, an excessive amount of zinc can form which cannot be accommodated by either diffusion into aluminum or reaction with silver. In this case, the zinc will remain as a zinc rich region at the interface; if the temperature goes above 720° F a molten phase can form. Melting of the zinc rich region can disrupt the continuity of the interface and lead to a lower corrosion resistance. Generally a fairly wide range of flux concentrations have been found to produce satisfactory joints and excess zinc regions can be avoided. These concentrations vary from 15-50 grams of solid/100cc of solvent.

The temperature and time of soldering determines the extent of the reaction at the interface. The minimum temperature is dictated by lowest temperature at which the flux will react. The maximum temperature is dependent upon the degree of interaction in zinc, aluminum and silver. If too high a temperature is reached before sufficient zinc diffusion and reaction with the silver occurs, melting of the zinc rich areas can occur and the interfacial structure can be disrupted.

The exact times and temperatures used for soldering are somewhat dependent upon the type of furnace used. As an example, in a close recirculating air furnace, where the air moves around the sample, a time of about 5 minutes is required at a temperature of 750° F. With a furnace where air is forced through the sample to be soldered, a time of only 2.5 minutes at 750° F is required. The difference is basically a heat-up rate to the flux reaction temperture. Thus, it is the time and temperature after the flux reacts that is important.

Second Soldering Composition

Figure 2:
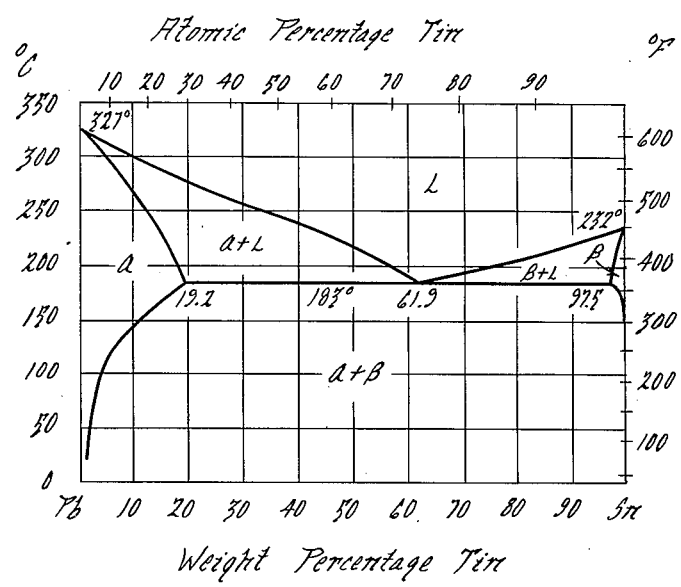
FIG. 2 is a graphical illustration of phases of a Pb-Sn system.

The essential characteristics of the second composition requires that there be a proper melting temperature interval with the first soldering composition, it may optionally possess a similar corrosion resistance characteristic as to the first composition, but this is not essential since there is little opportunity for interfacial reaction at the interface 16. The second composition must be capable of wetting the first composition. To this end, a prefered range of composition would be binary lead-tin system wherein lead may be varied from 22–45 percent and the tin varied from 55–78 percent if the heat sensitive tolerance level is about 400° F. A small amount of antimony can be tolerated up to 0.1 percent, some bismuth or cadmium may be tolerated but in very small amounts. Other appropriate selections in the PbSn binary system can be made by observing the proper melting temperature and choosing the combination based upon what is required to be substantially liquid at such temperature (see FIG. 2). It is suggested that the combinations shown below can also be utilized provided the melting temperature is selected as one which is equal to or below the heat-sensitivity level of the component to be joined.

The evaluation of the degree of corrosion was made mainly by metallographic examination. About 10 percent joint corrosion at 15 occurs with the new soldered joint (considered very good) while complete separtion of the joint occurs with other systems. Accelerated corrosion tests thus indicate that this new soldering method is superior in corrosion resistance to a number of other systems especially when used to join aluminum to brass or copper. A conventionally soldered aluminum-brass joint (40Pb–60Sn) falls apart in the first 48 hours.

The aluminum parts referred to herein and in the appended claims may be made of any aluminum or aluminum alloy which does not contain any great amount of constituent which metls at or below the melting point of the aluminum-silver eutectic, i.e., 1,050° F. Parts made of either aluminum or aluminum alloy are herein comprehended within the term aluminum part.

Figure 4:
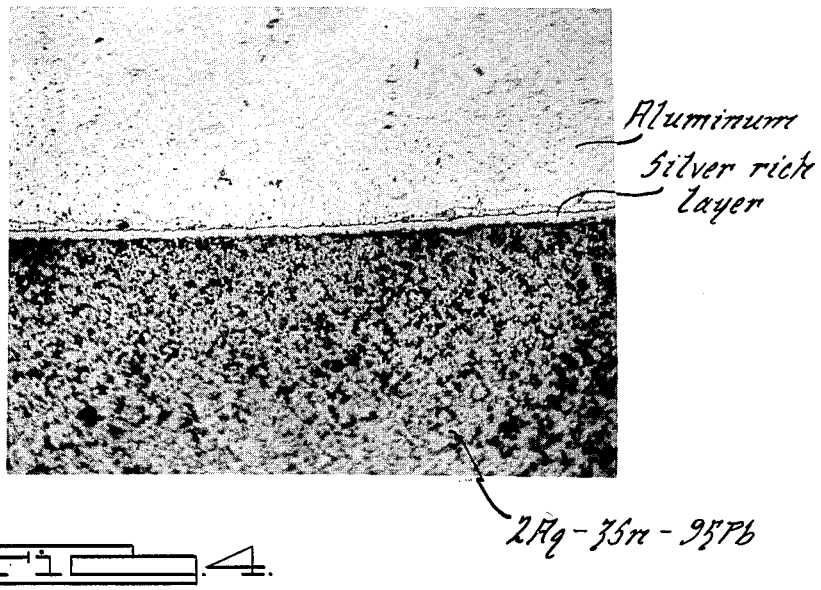
FIGS. 3 and 4 are photomicrographs of the microstructure developed at the interface of a soldered joint according to the method of this invention, FIG. 3 being at 75X and FIG. 4 at 750X.
Figure 3:
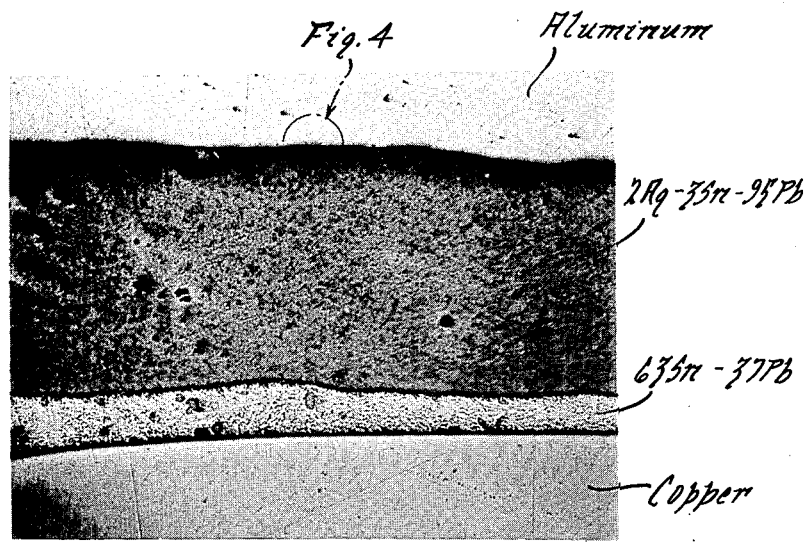

The resultant solder joint of one specific embodiment will appear as shown in FIGS. 3 and 4. In FIG. 3, the aluminum part and heat-sensitive component, here copper, are joined by a double solder layer, the first

| Composition | Melting Temperature | | Bi | Pb | Sn | Cd | Other | |
|---|---|---|---|---|---|---|---|---|
| | F | C | | | | | | |
| 1. | 117 | 46.8 | 44.70 | 22.60 | 8.30 | 5.30 | 19.10 | In |
| 2. | 136 | 58 | 49.00 | 18.00 | 12.00 | | 21.00 | In |
| 3. | 158 | 70 | 50.00 | 26.70 | 13.30 | 10.00 | | |
| 4. | 197 | 91.5 | 51.60 | 40.20 | | 8.20 | | |
| 5. | 203 | 95 | 52.50 | 32.00 | 15.50 | | | |
| 6. | 217 | 102.5 | 54.00 | | 26.00 | 20.00 | | |
| 7. | 255 | 124 | 55.50 | 44.50 | | | | |
| 8. | 281 | 138.5 | 58.00 | | 42.00 | | | |
| 9. | 288 | 142 | | 30.60 | 51.20 | 18.20 | | |
| 10. | 291 | 144 | 60.00 | | | 40.00 | | |
| 11. | 351 | 177 | | | 67.75 | 32.25 | | |
| 12. | 362 | 183 | | 38.14 | 61.86 | | | |
| 13. | 390 | 199 | | | 91.00 | | 9.00 | Zn |
| 14. | 430 | 221.3 | | | 96.50 | | 3.50 | Ag |
| 15. | 457 | 236 | | 79.7 | | 17.7 | 2.60 | Sb |
| 16. | 477 | 247 | | 87.0 | | | 13.00 | Sb |

The high tin selections will all be corrosion resistant which is desirable. The tin selections will not be significantly corrosion resistant, but this is not essential since the interface 16 is not subject to high corrosive factors.

Corrosion Testing

For the purpose of this invention corrosion evaluation was based as follows. The life of a soldered joint depends both on the structure of the soldered-metal interface and the environment. Comparison between laboratory corrosion test results, reported in the literature are, is in most cases difficult to make because of the different means used to evaluate the degree of corrosion. Because of this, joints made with the new soldering compositions were compared to various soldered and brazed joints. The other solders examined included zinc — 5 percent aluminum and zinc — 30 percent tin.

Two corrosion tests were used:
1. immersion in a 3 percent sodium chloride solution held at 160° F with air bubbling through it; time in solution — 200 hours.
2. a dip in a 3 percent sodium chloride solution and exposed to 96 percent relative humidity at 180° F; exposure time — 65 hours.

being 2Ag – 3Sn – 95Pb and the other being a low melting solder 63Sn – 37Pb. The silver-rich layer (75 percent silver – 25 percent zinc) can only be seen in FIG. 4.

I claim as my invention:

1. A method of effecting a corrosion resistant joint between the surface of an untreated aluminum part and the surface of a heat sensitive dissimilar metal part having a maximum tolerance temperature level, comprising:
   a. applying an anhydrous flux to at least said surface of the untreated aluminum part,
   b. applying a first solder to at least the fluxed surface of the aluminum part, said first solder consisting essentially of lead, 1–10 percent tin, a significant amount of silver up to 5 percent, and not over 0,1 percent antimony,
   c. heating said surface and solder to a temperature above the maximum tolerance temperature level of said dissimilar metal part for a period of time sufficient to establish a silver rich interface between the aluminum and said first solder and thereafter permitting said surface and solder to cool,
   d. fluxing said first solder on the aluminum part with a second flux, e. applying a corrosion resistant second solder to the refluxed first solder, said second solder having a melting range below said maximum tolerance temperature level, and
f. melting said second solder while attachting said heat sensitive part to said heated second solder to complete said joint.

2. The method as in claim 1, in which means is employed to retain the residency of said first solder in a predetermined location on said aluminum part during heating.

3. The method as in claim 2, in which said means comprises a depression in the surface of said part.

4. The method as in claim 1, in which the temperature above which said first solder is heated is determined by the chemistry thereof, and the second solder having a melting temperature at an interval below the maximum tolerance temperature of said heat sensitive component.

5. The method as in claim 1, in which said anhydrous flux is comprised of about 88 percent ZnCl, 10 percent $NH_4Cl$, 2 percent NaF in a dry organic solvent.

6. A method as in claim 1, in which said first solder contains 3–5 percent tin and 2–3 percent silver.

7. The method as in claim 1, in which said second solder is specifically of a tin-lead binary metallurgical system having lead in the range of 22–45 percent and tin in the range of 55–78 percent.

8. The method as in claim 1, in which said joint is washed prior to step (d) in hot water to remove chloride residuals.

9. The method as in claim 1, in which said second flux is rosin.

10. The resulting product of the method of claim 1.

11. The product of claim 10 wherein the aluminum part and dissimilar metal is connected by a layer of high melting solder 2Ag – 3Sn – 95Pb and a layer of low melting solder 63Sn – 37Pb.

* * * * *